(12) United States Patent
Vallabhu et al.

(10) Patent No.: US 10,715,989 B2
(45) Date of Patent: Jul. 14, 2020

(54) SYSTEMS AND METHODS FOR IMPLEMENTING PEER-TO-PEER WIRELESS CONNECTIONS

(75) Inventors: Venkata R. Vallabhu, Aloha, OR (US); Rita Lee, Hillsboro, OR (US); Marc Meylemans, Beaverton, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 13/977,631

(22) PCT Filed: Apr. 26, 2012

(86) PCT No.: PCT/US2012/035296
§ 371 (c)(1),
(2), (4) Date: May 2, 2014

(87) PCT Pub. No.: WO2013/133857
PCT Pub. Date: Sep. 12, 2013

(65) Prior Publication Data
US 2014/0233547 A1 Aug. 21, 2014

Related U.S. Application Data

(60) Provisional application No. 61/607,895, filed on Mar. 7, 2012.

(51) Int. Cl.
*H04W 8/00* (2009.01)
*G06F 9/44* (2018.01)
*H04L 29/08* (2006.01)

(52) U.S. Cl.
CPC .............. *H04W 8/005* (2013.01); *G06F 9/44* (2013.01); *H04L 67/16* (2013.01)

(58) Field of Classification Search
CPC ........ H04W 8/005; H04W 76/14; H04L 67/16
(Continued)

(56) References Cited

U.S. PATENT DOCUMENTS

2008/0320396 A1* 12/2008 Mizrachi ............... G06F 3/0485
715/744
2009/0046315 A1* 2/2009 Ferlitsch ............... G06F 21/608
358/1.15

(Continued)

FOREIGN PATENT DOCUMENTS

| CA | 2780669 | 5/2011 |
|---|---|---|
| WO | 2011062404 | 5/2011 |
| WO | 2013/133857 A1 | 9/2013 |

OTHER PUBLICATIONS

International Search Report and Written opinion received for PCT Application No. PCT/US2012/035296, dated Jan. 17, 2013, 9 pages.

(Continued)

*Primary Examiner* — Hoon J Chung
(74) *Attorney, Agent, or Firm* — Eversheds Sutherland US LLP

(57) ABSTRACT

Systems and methods are described herein for connecting related applications over a peer-to-peer network wireless connection using layer 2 communications protocols to initiate the connection between the applications. The layer 2 communications protocols include discovery frames that may be used to discover various types of systems available on a wireless network. The discover frames also include application names or identifiers that may be used to discover which applications are available for connecting with other systems over the wireless network.

20 Claims, 7 Drawing Sheets

(58) Field of Classification Search
USPC .................................................. 370/254, 338
See application file for complete search history.

(56) References Cited

U.S. PATENT DOCUMENTS

| | | | |
|---|---|---|---|
| 2010/0183025 A1* | 7/2010 | Stephens | H04L 29/06 370/466 |
| 2010/0233960 A1 | 9/2010 | Tucker et al. | |
| 2010/0233996 A1* | 9/2010 | Herz | H04L 63/08 455/411 |
| 2010/0262619 A1* | 10/2010 | Zargahi | G06F 8/61 707/770 |
| 2010/0322213 A1* | 12/2010 | Liu | H04W 48/16 370/338 |
| 2011/0082940 A1* | 4/2011 | Montemurro et al. | 709/227 |
| 2011/0149806 A1 | 6/2011 | Verma et al. | |
| 2011/0213876 A1* | 9/2011 | Kumar | H04L 67/16 709/224 |
| 2011/0280233 A1 | 11/2011 | Choi et al. | |
| 2011/0305227 A1* | 12/2011 | Heerboth | H04W 8/005 370/338 |
| 2012/0011247 A1 | 1/2012 | Mallik et al. | |
| 2013/0067068 A1* | 3/2013 | Hassan | H04W 76/02 709/224 |
| 2013/0166759 A1* | 6/2013 | Rajamani et al. | 709/227 |
| 2013/0229944 A1* | 9/2013 | Montemurro | H04W 4/21 370/254 |

OTHER PUBLICATIONS

International Preliminary Report on Patentability and Written Opinion received for PCT Patent Application No. PCT/US2012/035296 dated Sep. 18, 2014, 6 Pages.
Office Action for Japanese Patent Application No. 2014-560900 dated Aug. 25, 2015. 3 pages Japanese Office Action, 3 pages English Translation.
Extended European Search Report for European Patent Application 12870855.9 dated Nov. 11, 2015. 10 pages.
Qi et al., Emily H. "Augmenting Wireless LAN Technology for Wi-Fi Pan." Signals, Systems and Computers, 2009 Conference Record of the Forty-Third Asilomar Conference. Nov. 1, 2009. pp. 321-324.
Bajko, Gabor. L2 Service Discovery; 11-09-0354-00-000u-12-service discovery; vol. 802.11u. Mar. 10, 2009. pp. 1-8.
Office Action for Chinese Patent Application No. 201280071201, dated Sep. 27, 2016, 26 pages (15 pages English translation).
Second Office Action for Chinese Application No. 201280071201. X, dated May 26, 2017, 25 pages (15 pages English translation).
Office Action for Chinese Application No. 201280071201, dated Dec. 4, 2017, 25 pages (15 pages English translation, 10 pages Chinese).
Office Action for European Application No. 12870855.9, dated Nov. 24, 2017, 5 pages.
Office action for Chinese Application No. 201280071201.X, dated Jun. 4, 2018, 7 pages (4 pages English translation, 3 pages Chinese).
Fifth Office Action for Chinese Application No. 201280071201.x, dated Dec. 5, 2018, 8 pages (4 English translation, 4 Chinese).

\* cited by examiner

SYSTEMS AND METHODS FOR IMPLEMENTING PEER-TO-PEER WIRELESS CONNECTIONS

TECHNICAL FIELD

This disclosure generally relates to systems and methods for implementing peer-to-peer wireless network connections.

BACKGROUND

The use of mobile devices has become widespread and the need to network or communicate between mobile devices that are in close proximity to each other has increased. Several methods have been developed (e.g., Universal Plug and Play, Bonjour, and Wi-Fi Direct) to facilitate mobile device networking and the networking of mobile devices to other nearby non-mobile devices.

Typically, mobile devices advertise their availability to network with other devices via a generic connection request. The generic connection request may provide the ability to identify devices that are capable of establishing a wireless connection with another device. Once the devices have identified each other, a wireless or Wi-Fi connection enables applications and services on the devices to exchange information.

BRIEF DESCRIPTION OF THE FIGURES

The features within the drawings are numbered and are cross referenced with the written description. Generally, the first numeral reflects the drawing number where the feature was first introduced, and the remaining numerals are intended to distinguish the feature from the other notated features within that drawing. However, if a feature is used across several drawings, the number used to identify the feature in the drawing where the feature first appeared will be used. Reference will now be made to the accompanying drawings, which are not necessarily drawn to scale and wherein.

DETAILED DESCRIPTION OF EMBODIMENTS OF THE INVENTION

Embodiments of the invention are described more fully hereinafter with reference to the accompanying drawings, in which embodiments of the disclosure are shown. This disclosure may, however, be embodied in many different forms and should not be construed as limited to the embodiments set forth herein; rather, these embodiments are provided so that this disclosure will be thorough and complete, and will fully convey the scope of the disclosure to those skilled in the art.

Embodiments described in this disclosure may provide systems, methods, and apparatuses for implementing a peer-to-peer wireless network connection between two mobile devices by using a simplified protocol. In one aspect, a mobile device user may want to exchange data or information related to a single application with another mobile device user. Typically, this requires the user to implement a detailed communications protocol to establish a Wi-Fi and TCP/IP connection. In the alternative, this disclosure describes systems and methods to initiate a connection directly from the single application without having to establish a TCP/IP connection. Various aspects of existing communications protocols may be modified to enable a streamlined process for establishing a peer-to-peer wireless network connection between an application on a first mobile device and a corresponding application on second mobile device.

Example embodiments of the invention will now be described with reference to the accompanying figures.

Figure 1:
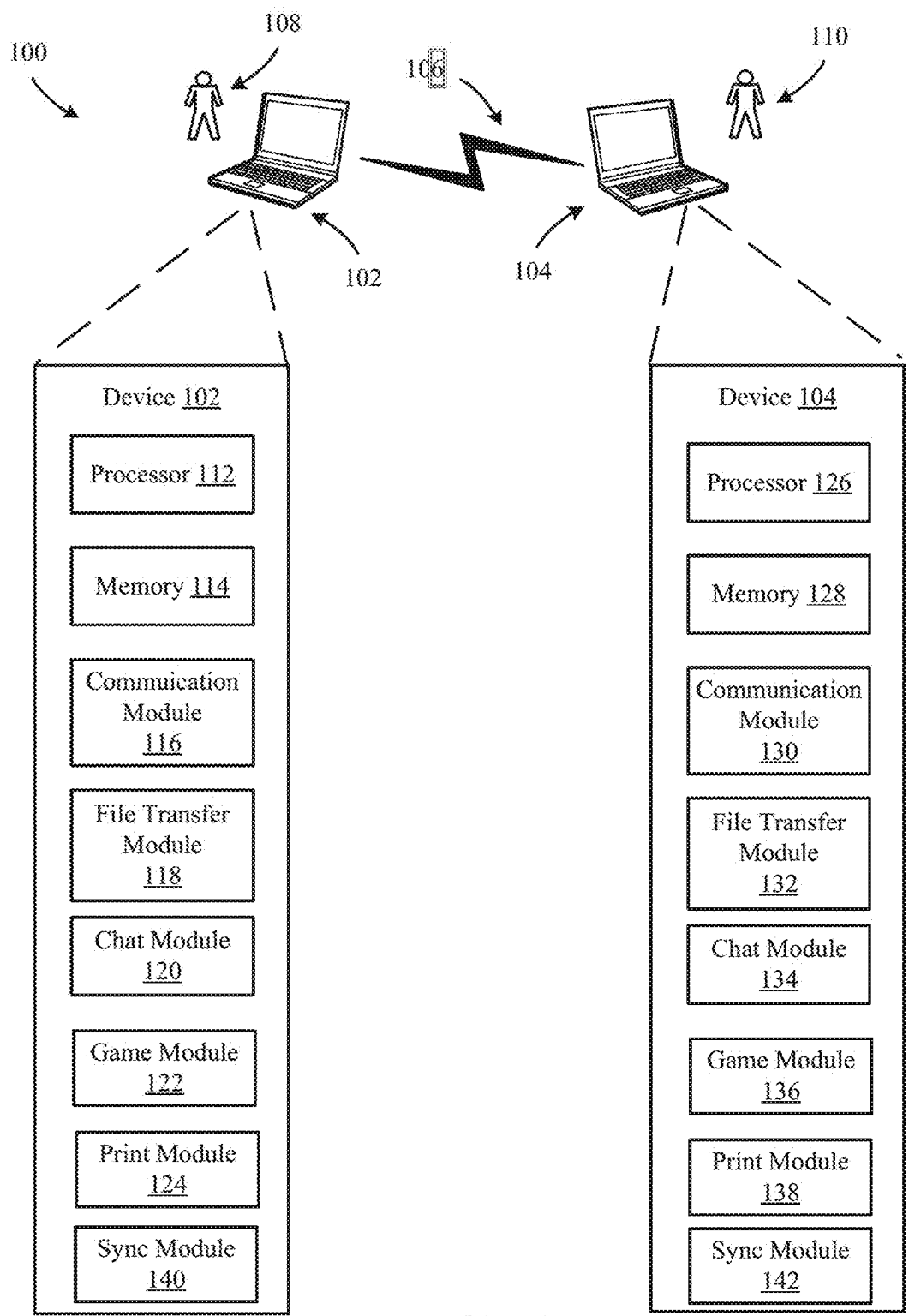
FIG. 1 is a simplified block diagram of a representative environment of a peer-to-peer wireless network and the mobile devices that are implementing the peer-to-peer wireless network in accordance with an embodiment of the disclosure.

FIG. 1 is a simplified block diagram of a representative environment of a peer-to-peer wireless network and the mobile devices that are implementing the peer-to-peer wireless network. The environment 100 may include a first mobile device 102 and a second mobile device 104 coupled together by a peer-to-peer wireless network connection 106. In this embodiment, the peer-to-peer wireless network connection does not require an access point to create an ad-hoc network between the two devices. Generally, the peer-to-peer network enables nearby devices to discover and communicate with each other. For example, the wireless network connection 106 enables a first user 108 and a second user 110 to exchange information between their respective devices 102, 104.

In one embodiment, the first device 102 may include a computer processor 112, memory 114, a communications module 116, a file transfer module 118, a chat module 120, a game module 122, and a print module 124. However, the first device 102 may include a variety of other modules (not shown) that may be used or found on any type of mobile device. For instance, the first device 102 may include a video module, an audio module, and any other module for a feature or application that may be implemented by the first device 102.

In this embodiment, the computer processor 112 may execute computer-readable instructions stored in memory 114 that enable the device to execute installed hardware, applications, or services. The one or more computer processors 112 may include, without limitation, a central processing unit (CPU), a digital signal processor (DSP), a reduced instruction set computer (RISC), a complex instruction set computer (CISC), a microprocessor, a microcontroller, a field programmable gate array (FPGA), or any combination thereof. The device 102 may also include a chipset (not shown) for controlling communications between the one or more processors 112 and one or more of the other components of the device 102. In certain embodiments, the device 102 may be based on an Intel® Architecture system and the processor(s) 112 and chipset may be from a family of Intel® processors and chipsets, such as the Intel® Atom® processor family. The one or more processors 112 may also include one or more application-specific integrated circuits (ASICs) or application-specific standard products (ASSPs) for handling specific data processing functions or tasks.

In this embodiment, the memory 114 may include one or more volatile and/or non-volatile memory devices including, but not limited to, random access memory (RAM), dynamic RAM (DRAM), static RAM (SRAM), synchronous dynamic RAM (SDRAM), double data rate (DDR) SDRAM (DDR-SDRAM), RAM-BUS DRAM (RDRAM), flash memory devices, electrically erasable programmable read-only memory (EEPROM), non-volatile RAM (NVRAM), universal serial bus (USB) removable memory, or combinations thereof.

In this embodiment, the communication module 116 may implement and manage wireless communications for the first device 102. The communication module may include a wireless system that may include the hardware and software to broadcast and receive messages either using the Wi-Fi Direct Standard (See; Wi-Fi Direct specification published in October 2010) and or the IEEE 802.11 wireless standard (See IEEE 802.11-2007, published Mar. 8, 2007; IEEE 802.11n-2009, published October 2009) or a combination thereof. The wireless system may include a transmitter and a receiver or a transceiver (not shown) capable of operating in a broad range of operating frequencies governed by the 802.11 wireless standard.

In this embodiment, the device 102 may include several modules and/or applications that enable specific functions on the device 102. For example, the file transfer module 118 may enable the first device 102 to share files with other devices, whether moving, copying, or transferring various files that are stored in memory 114. The chat module 120 may enable the near-real-time exchange of text, video, or audio data between two or more devices. The game module 122 may enable the playing of interactive games that may include various video, audio, and control features. In one aspect, games may be played in near-real-time between mobile devices, so that the users may play against or with each other in a common game environment. A print module 124 may enable interfacing with remote printers to allow the user to print any type of document stored on the first device 102. Lastly, the first device 102 may include a synchronization module 140 that may enable the device 102 to synchronize various files (e.g., music, video, text) with another device 104 or a remote storage device (not shown) that maintains copies or the originals of the files located on the first device 102. The second device 104 may also include a computer processor 126, is memory 128, and the same or similar modules described above, such as the communication module 130, the file transfer module 132, the chat module 134, the game module 136, the print module 138, and the synchronization module 142. It should be noted that the modules described above could be implemented by hardware, software, or a combination thereof.

Figure 2:
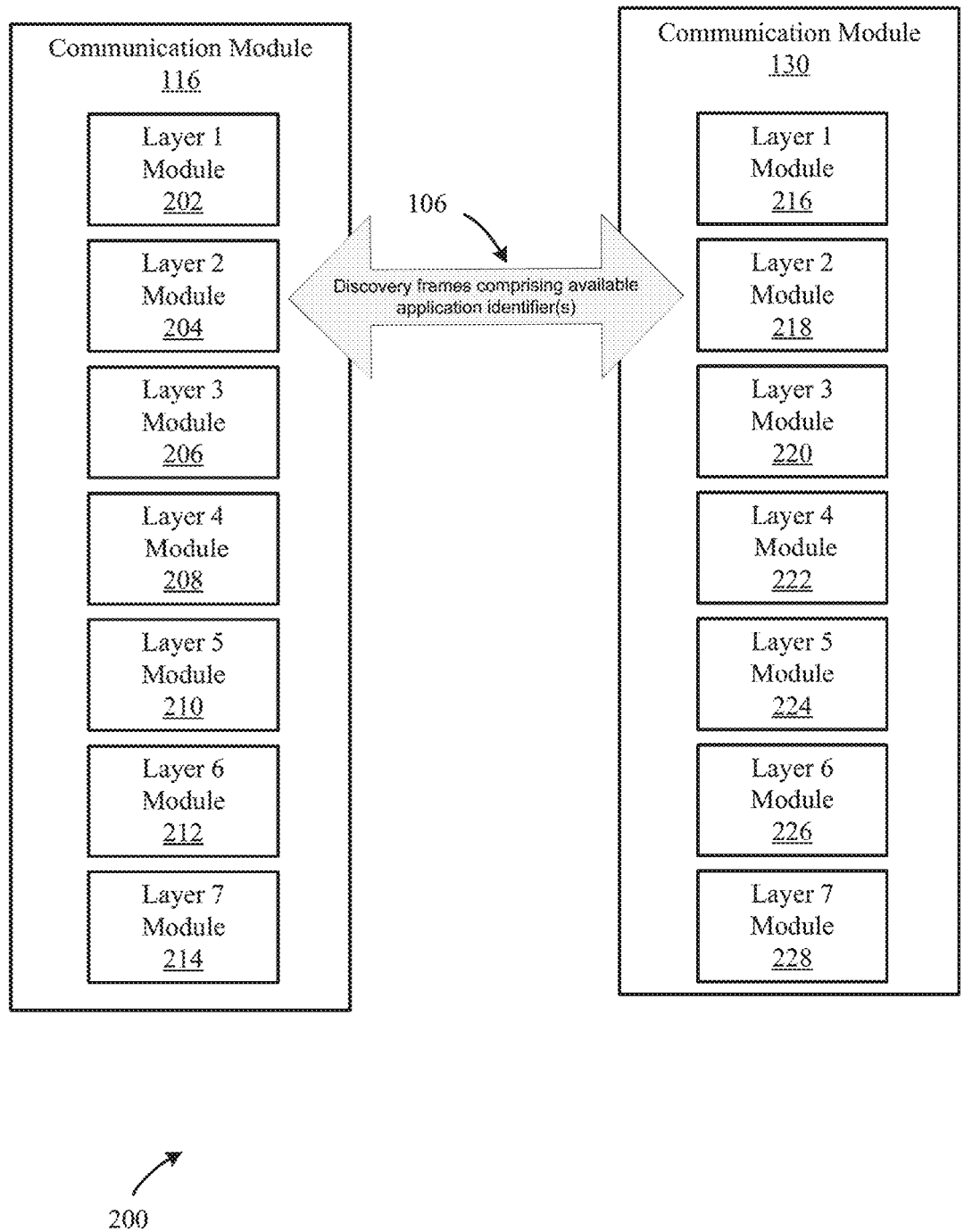
FIG. 2 is a simplified block diagram illustrating one embodiment of how mobile devices establish a peer-to-peer wireless network in accordance with an embodiment of the disclosure.

FIG. 2 is a simplified block diagram 200 illustrating how the mobile devices may establish a peer-to-peer wireless network. Diagram 200 provides additional detail for the communication modules 116, 130 described in FIG. 1. In this embodiment, the communication modules 116, 130 may include modules that operate under the Open System Interconnection (OSI) model of networking. Generally, the OSI model is broken down into media layers and host layers. The media layers may include the physical layer (layer 1), the data link layer (layer 2), and the network layer (layer 3). The layer 1 modules 202, 216 relate to media, signal, and binary transmission of data. The layer 2 modules 204, 218 may relate to physical addressing, the data in layer 2 is composed of discovery action frames or action frames that may be used for discovering other devices on the network. The layer 3 modules 206, 220 may relate to path determination and logical addressing; data in this layer is referred to as packets. The host layers include the transport layer (layer 4), the session layer (layer 5), the presentation layer (layer 6), and the application layer (layer 7). The layer 4 modules 208, 222 may relate to end-to-end connections, reliability, and flow control and are generally referred by units of segments. The layer 5 modules 210, 224 may relate to interhost communication and managing sessions between applications. The layer 6 modules 212, 226 may relate to data representation, encryption, and decryption. The layer 7 modules 214, 228 may relate to application data for process-to-process communications across an Internet Protocol network.

Under layer 2 protocols, a device (e.g., device 102) may advertise that it is soliciting other devices (e.g., device 104) to establish a Wi-Fi direct connection or peer-to-peer wireless network connection 106. Advertising occurs by sending or broadcasting information from one device over the network to other devices. Layer 2 advertising or discovery protocols may include beacon frames, probe request frames, and probe response frames that contain address or network information (e.g., Service Set ID) for a device 102. In general, a receiving device (e.g., device 104) may extract the address and network from the frames sent by the transmitting device (e.g., device 102). The frames or discovery action frames may include information fields in addition to the address and network information fields. For example, the frames may also include a primary device type field and a secondary device type field. The primary device type field may generally include device information related to the types of devices that the transmitting device is looking for over the network. In one embodiment, the secondary device type field may include a list of additional devices being sought over the network. The device type fields may include vendor specific device information related to the make or model of the device. Further, the device information may also include hardware-specific features that the device should include. However, in an alternative embodiment, the secondary device type field may include the name or identifier of one or more applications or services being sought on the devices that are on the network. The applications and services may include the features described above in FIG. 1 and any other type of application or service that may be performed by a computing device.

Figure 3:
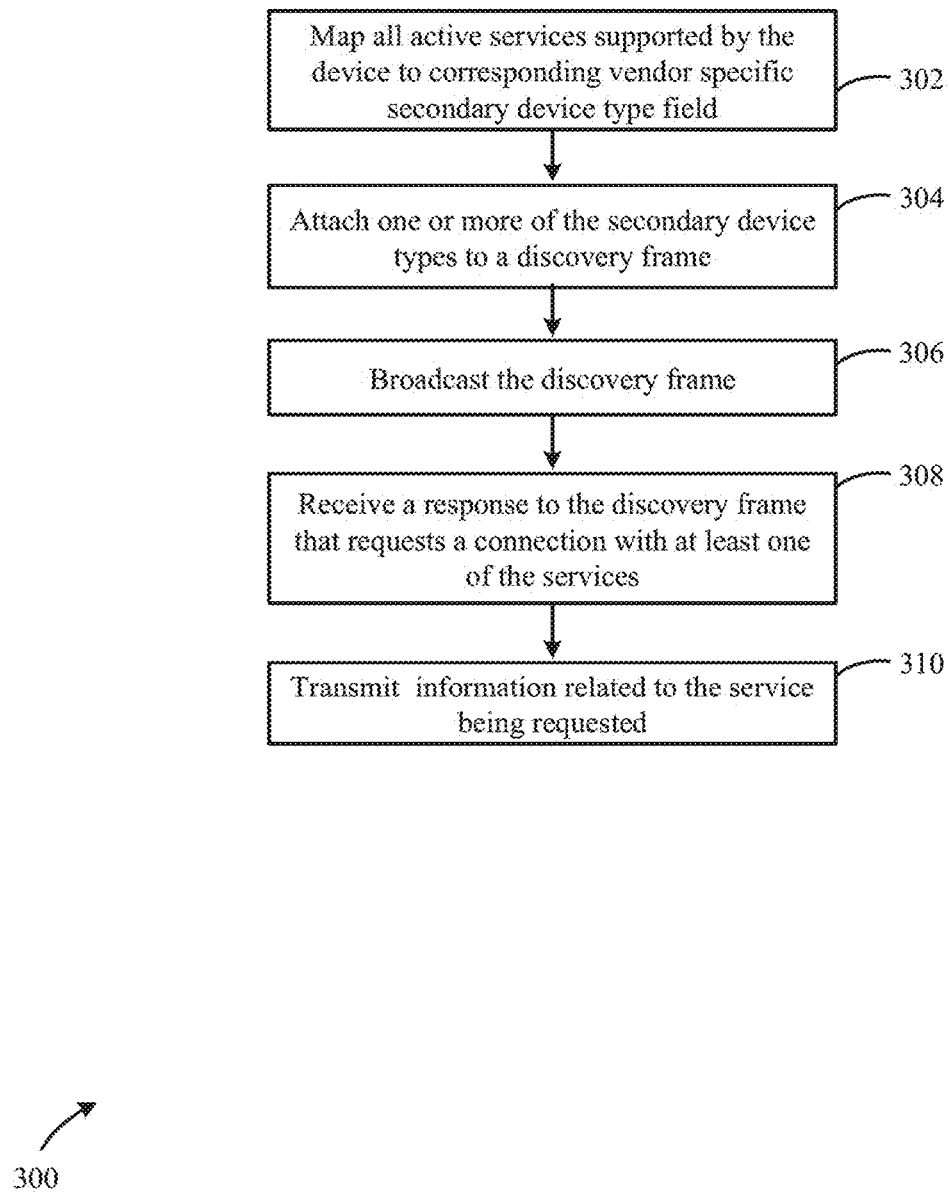
FIG. 3 is a flow diagram illustrating an exemplary method for initiating a peer-to-peer wireless network connection for an application on to mobile device in accordance with an embodiment of the disclosure.

FIG. 3 is a flow diagram of a method 300 for initiating a peer-to-peer wireless network connection for an application on a mobile device. The method 300 illustrates implementing application advertising by the device 102 using the layer 2 protocol described above.

At block 302, device 102 maps all applications and services to the secondary device type field used in the action frames being broadcast over the network. The action frames may include one or more of any layer 2 communication frame including, but not limited to, beacon frames, probe response frames, and probe request frames. In one embodiment, the secondary device type field may be vendor specific, so that the devices being sought are of a vendor specific type. The vendor specific type may be mapped in the primary device type field.

The beacon frames are broadcast over the wireless network and include the Service Set Identifier (SSID) that advertises the presence of the device 102 to other devices (e.g., device 104) on the wireless network 106. The beacon is periodically broadcasted over the wireless network 106. In the peer-to-peer context, the beacon is broadcast to devices within a relatively short distance away, less than 150 feet from the device. In addition to the SSID, the beacon may also include the primary device type and secondary device type information. For example, the primary device type field may include vendor-specific details of the devices being sought by the device 102. The secondary device type field may include the application identifiers for applications being sought by the device 102.

The probe request frames may be used to request information from other devices on the wireless network connection 106. For example, the probe request frame may request other devices to respond to the probe request to determine which devices are within range of the transmitting device. The probe request may also include primary device type and secondary device type information. The device type information may be treated as a request to determine if certain types of devices (e.g., using the primary device type field) are within range and whether they have specific applications installed (e.g. using the secondary device type field). In a similar manner, the probe response frames sent in response to receiving the probe request frames may also include the primary and secondary device type information.

At block 304, the secondary device type field is attached to a discovery frame that may be broadcast by the device 102. As noted above, the discovery frame may include, but is not limited to, the beacon frame, the probe request frame, and the probe response frame.

At block 306, the discovery frame is broadcast by the device 102 over the network 106. The discovery frame is attempting to discover nearby devices (e.g., device 104). If the discovery frame may include the primary and secondary device type information, the discovery frame may be attempting to locate nearby devices of a certain device type that have certain applications installed. In another embodiment, the discovery frame may include the secondary device type information and is used to detect any devices, regardless of type, that have the one or more applications listed in the secondary device type field installed on the device.

At block 308, a response to the discovery frame is received at the device 102. The response is an action frame sent from another device 104 on the network that may include a request to connect with the device 102 using one or more of the applications. In one embodiment, the response may indicate that the device 104 does not include the applications being sought by the device 102 that sent the discovery frame. In another embodiment, the response may indicate that the device 104 does include the application being sought by the broadcasting device 102. The response may also include a request from the device 104 for access to the one or more applications installed on the broadcasting device 102.

At block 310, upon receiving the response to connect with another device 104, the communication module 116 initiates a connection with the device 104. Once the connection is made between the application of the first device 102 with the application on the second device 104, the first and second devices begin exchanging application-related information over the wireless network connection 106.

Figure 4:
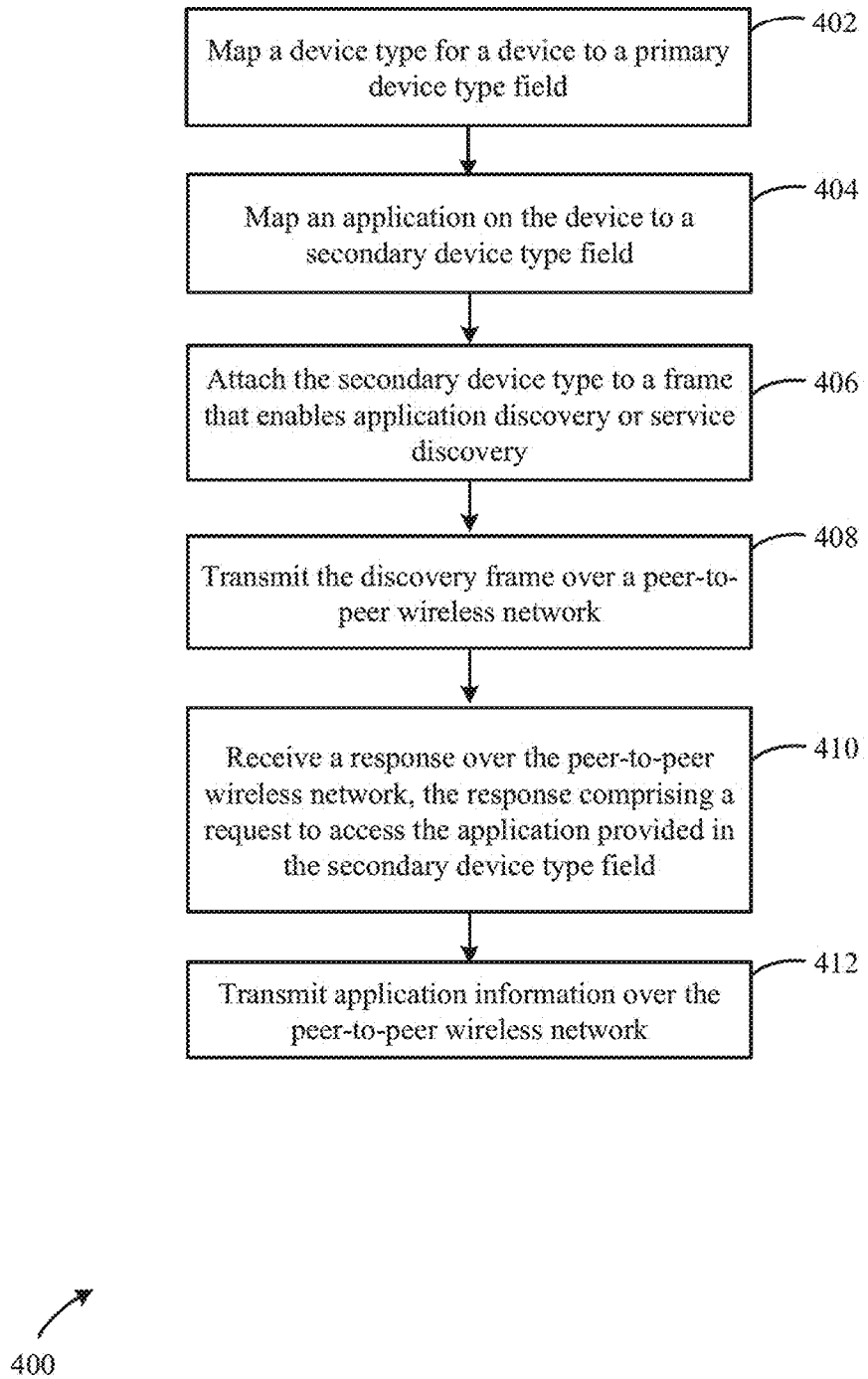
FIG. 4 is a flow diagram illustrating another exemplary method for initiating a peer-to-peer wireless network connection for an application on a mobile device in accordance with an embodiment of the disclosure.

FIG. 4 is a flow diagram 4 illustrating another method 400 for initiating a peer-to-peer wireless network connection for an application on a mobile device 102. The method 400 illustrates implementing application advertising by the device 102 using the layer 2 protocol described above. It should be noted that the sequence of events presented in the method 400 is merely representative of one embodiment. In other embodiments, the events may be implemented in a different sequence and may even omit one or more of the events in another sequence.

At block 402, the device 102 determines, or is instructed on, which types of devices that the device 102 wants to connect with over a wireless network connection 106. The device type may include any device with a network connection or a vendor-specific device based on make, model, or operating system version. The device type information may be mapped to a primary device type field that may be used in layer 2 discovery frames or action frames. As noted above, the primary device type field is used by layer 2 discovery techniques to locate specific types of devices connected to the network.

At block 404, the device 102 determines, or is instructed on, which application is needed to connect with a corresponding application on another device 104. The device maps the application name or identifier to the secondary device type field. As noted above, the secondary device type field mapped with an application name or identifier is used by layer 2 discovery techniques to locate specific applications on the devices connected to the network.

At block 406, the device 102 attaches the secondary device type field to a layer 2 action frame that is used for discovery of devices on the wireless network connection 106.

At block 408, the device 102 transmits the discovery action frame with the secondary device type field information over the wireless peer-to-peer network advertising for a compatible device with a compatible application. In another embodiment, the device 102 is advertising for any device that has a compatible application. A compatible application is an application or service that may interface with another application, successfully exchange information with another application, and/or is designed to interface with another application that is mapped in the secondary device type field of the action frame.

At block 410, the device 102 receives a response to the discovery action frame. In one embodiment, the response may include a connection request for the application that was included in the discovery action frame that was broadcasted. In another embodiment, the response may include an indication that the application specified in the discovery action frame is installed on the responding device 104.

At block 412, a connection over the wireless network is enabled between the application on the broadcasting device 102 and a corresponding application on the responding device 104. The connection is enabled to exchange information between the applications either on an exclusive or a non-exclusive basis. In the non-exclusive embodiment, the connection is enabled by making a wireless connection that may be used by other applications on the device to exchange information. In the exclusive embodiment, an exclusive connection is enabled between the applications advertised in the discovery action frame. The other applications on the devices are excluded from using the wireless connection.

Figure 5:
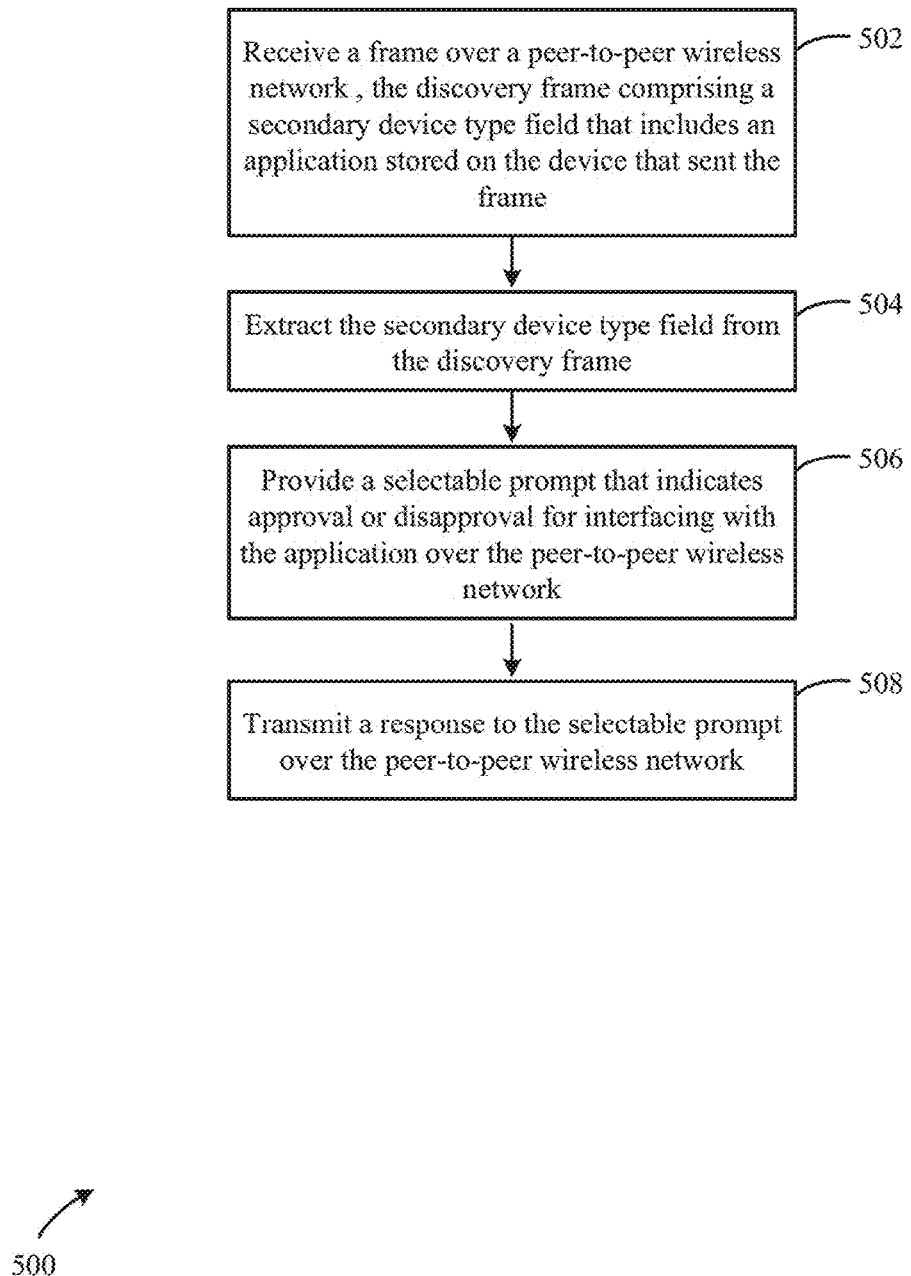
FIG. 5 is a flow diagram illustrating an exemplary method for establishing a peer-to-peer wireless network connection for an application on a mobile device with an application on another mobile device in accordance with an embodiment of the disclosure.

FIG. 5 is a flow diagram of a method 500 establishing a peer-to-peer wireless connection for an application on a mobile device 102 with an application on another mobile device 104. The method 500 illustrates responding to a discovery frame or action frame received by a device 104 using the layer 2 protocol described above.

At block 502, the device 104 receives a layer 2 communication (e.g., a discovery frame or action frame) over the peer-to-peer wireless network connection 106. The layer 2 communication may include, but is not limited to, a beacon frame or a probe request frame. Embedded within the one or more frames is a secondary device type field that has been modified to include an application name or identifier that is stored on the device 102 that sent the layer 2 communication.

At block 504, the device 104 extracts the application name from secondary device type field of the discovery frame or action frame. In one embodiment, the extraction process may include copying the application name from the secondary device type field. In another embodiment, the extraction process may include reading the information stored in the secondary device type field.

At block 506, if the device 104 has the same or similar service or application stored in memory 128 or a module 130-138 on the device, the computer processor presents a prompt on the display of the device 104 asking the user 110 whether the user 110 wants to interface with the device 102 using the application or service extracted from the discovery frame or action frame.

At block 508, the device 104 sends a response to the device 102 that was soliciting a connection over the peer-to-peer wireless network 106. The response may be an affirmative response or a negative response. If the soliciting device 102 receives an affirmative response the devices 102, 104 connect their respective applications to each other over the peer-to-peer wireless network and begin exchanging information.

Figure 6:
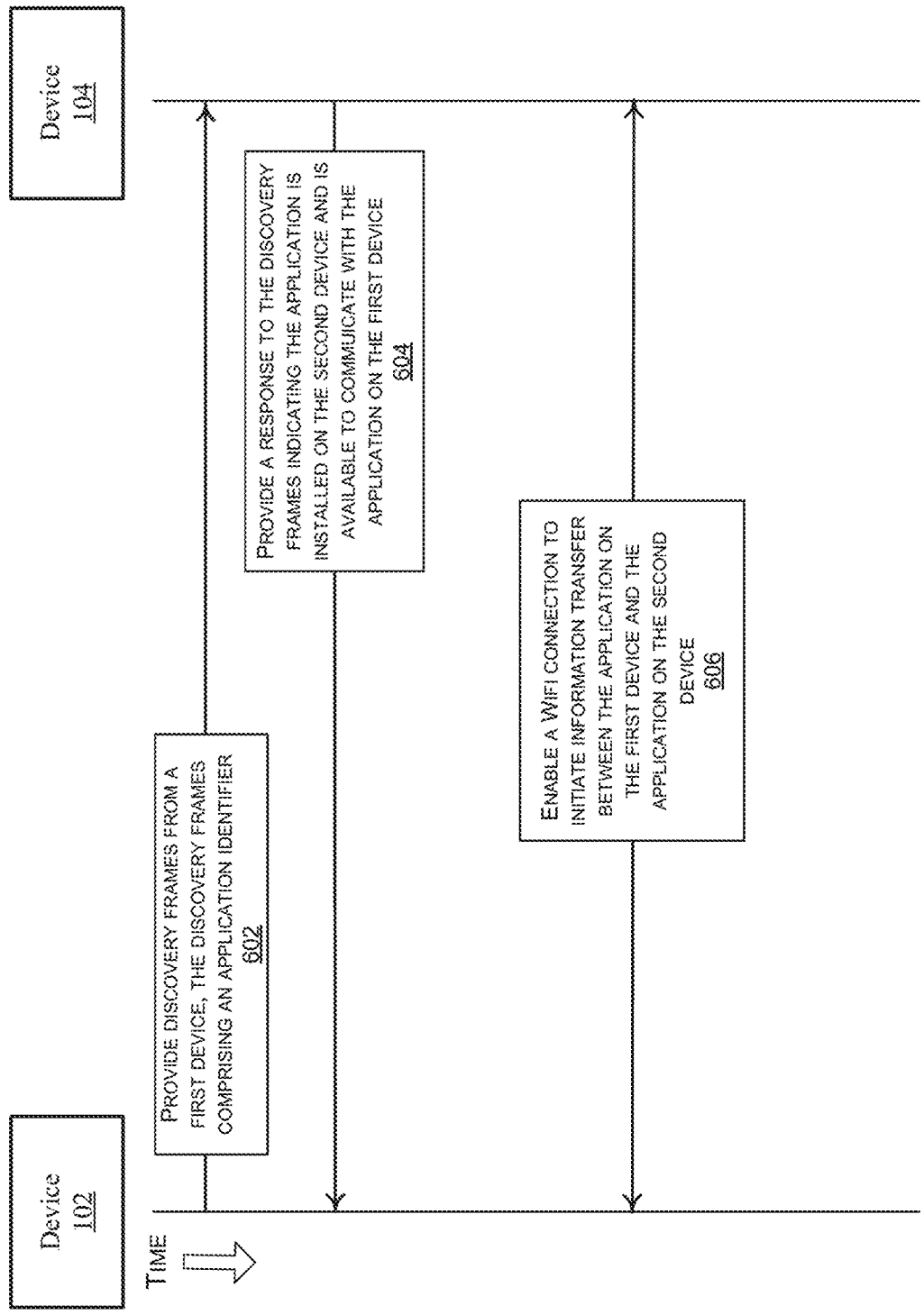
FIG. 6 is a flow diagram illustrating an exemplary method for establishing a peer-to-peer wireless network connection for an application between two mobile devices in accordance with an embodiment of the disclosure.

FIG. 6 is a flow diagram illustrating a method 400 for establishing a peer-to-peer wireless network connection 106 for a specific application between two devices 102, 104 using a layer 2 communications protocol. The flow diagram includes a time axis (e.g., time arrow) indicating the timing of the exchanges between the devices 102, 104.

At block 602, a first device 102 may provide discovery frames over a peer-to-peer wireless network connection 106 searching for other devices (e.g., device 104) that are within range. The discovery frames include an application name or identifier that the device 102 wants to discover on those devices. In one embodiment, the application name is stored in a secondary device type field embedded into the discovery frame. The discovery frame may be included as part of any layer 2 communications protocol. In one embodiment, the discovery frame may be a beacon frame. In another embodiment, the discovery frame may be a probe request frame.

At block 604, the second device 104 may provide a response to the discovery frame that it received from the first device 102. The response may include an indication that the application included in the discovery frame is stored or installed on the second device 104. The response may also include an indication that the second device 104 wants to exchange information, for example an operation, between the application on the first device 102 and the corresponding application on the second device 104.

In another embodiment, the second device 104 may provide a discovery frame that may include the application name embedded in the frame. In one embodiment, the application name is embedded in the secondary device type field of the discovery frame. The first device 102 receives the discovery frame and determines if the application is stored or installed, for example, in the memory of device 102. The first device 102 may send a response that indicates that the user 108 wants to exchange information with the second device 104 using the application.

At block 606, the devices 102 and 104 enable a wireless or Wi-Fi connection to exchange information between the corresponding applications stored on each device. In one embodiment, the Wi-Fi connection is non-exclusive and the connection may be used between any of the applications stored on the device. In another embodiment, the wireless or Wi-Fi connection is exclusive to the application embedded in the discovery frame.

Figure 7:
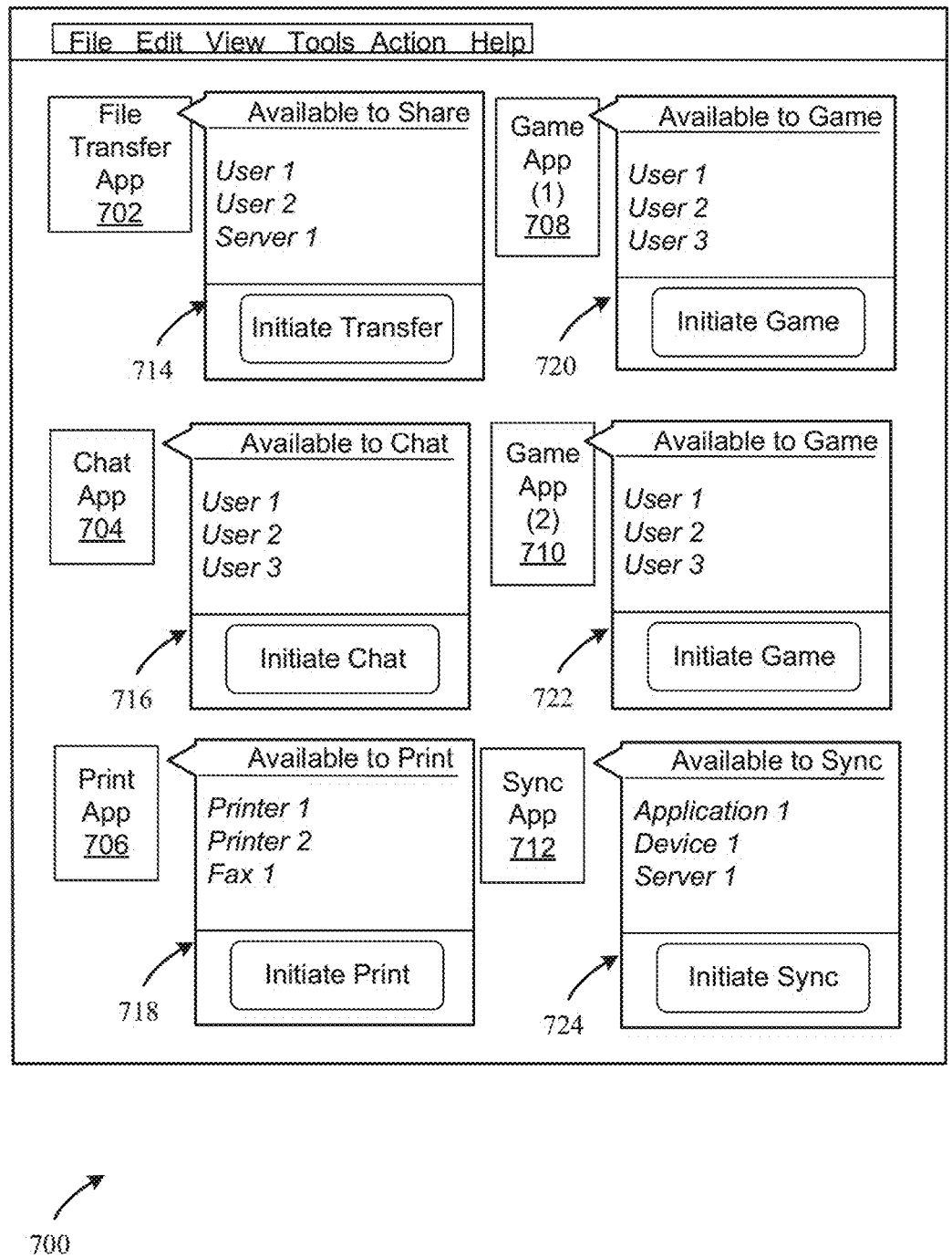
FIG. 7 is a simplified illustration of an interface of a mobile device that initiates a peer-to-peer wireless network for a plurality of applications in accordance with an embodiment of the disclosure.

FIG. 7 is a simplified illustration of an exemplary graphical user interface (GUI) 700 for device 102 that initiates a peer-to-peer wireless network connection for a plurality of applications. In this embodiment, a plurality of application icons 702-712 are positioned on the desk top of the GUI 700. The application icons are a selectable feature that may engage or spawn the application on the device. In one embodiment, the applications may include a file transfer application 702, a chat application 704, a print application 706, and a first game application 708, a second game application 710, and a synchronization application 712.

The file transfer application 702 may be used to transfer files within the device or to other devices connected to the device through copying, moving, or transferring files from one storage location to another storage location. The files may include any electronic document, file, instruction, or code.

The chat application 704 is enabled to exchange text, audio, or video message in a real-time or near-real-time manner between this device 102 and another device 104.

The print application 706 may enable printing of documents stored on the device 102. The device may interface with networked printers or with printers over a peer-to-peer wireless connection.

The game applications 708, 710 are representative of any game or entertainment program that may be played on the device, over a network, or over is peer-to-peer connection.

Lastly, the device 102 may include a synchronization application 712 that enables the device to synchronize files that are shared between other devices or that are stored remotely from the device 102. In one embodiment, the synchronization application 712 may synchronize the music file database of device 102 with a remote music file database stored on another device.

The GUI 700 also may include connection windows for each of the applications 714-724. The connection windows enable a user to select an application that the user wants to share or to interface with another user. In one embodiment, the file transfer connection window 714 may be spawned by right clicking on a mouse while the cursor (not shown) is hovering over the file transfer application 702. The file transfer connection window 714 may provide a list of available, targeted, or in-range users that may queried on whether they want their file transfer applications to communicate with each other over a peer-to-peer wireless network connection 106. In this embodiment, three users are shown to be available. The user 108 may select user 1, user 2, or server 1, or a combination thereof, and initiate a connection request by selecting the initiate button. In one embodiment, the initiate button enables the computer processor 112 to map the file transfer application to the secondary device type field being used in the layer 2 communication action frames. As described above in FIGS. 3-6, the secondary device type field enables the device 102 to connect its file transfer application with another file transfer application on another device 104. In other embodiments, the available entities may be printers, servers, databases, or applications running on another device.

Embodiments described herein may be implemented using hardware, software, and/or firmware, for example, to perform the methods and/or operations described herein. Certain embodiments described herein may be provided as a tangible machine-readable medium storing machine-executable instructions that, if executed by a machine, cause the machine to perform the methods and/or operations described herein. The tangible machine-readable medium may include, but is not limited to, any type of disk including floppy disks, optical disks, compact disk read-only memories (CD-ROMs), compact disk rewritables (CD-RWs), magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of tangible media suitable for storing electronic instructions. The machine may include any suitable processing or computing platform, device or system and may be implemented using any suitable combination of hardware and/or software. The instructions may include any suitable type of code and may be implemented using any suitable programming language. In other embodiments, machine-executable instructions for performing the methods and/or operations described herein may be embodied in firmware.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

The terms and expressions which have been employed herein may be used as terms of description and not of limitation. In the use of such terms and expressions, there is no intention of excluding any equivalents of the features shown and described (or portions thereof), and it is recognized that various modifications are possible within the scope of the claims. Other modifications, variations, and alternatives are also possible. Accordingly, the claims are intended to cover all such equivalents.

While certain embodiments of the invention have been described in connection with what is presently considered to be the most practical and various embodiments, it is to be understood that the invention is not to be limited to the disclosed embodiments, but on the contrary, is intended to cover various modifications and equivalent arrangements included within the scope of the claims. Although specific terms are employed herein, they may be used in a generic and descriptive sense only, and not for purposes of limitation.

This written description uses examples to disclose certain embodiments of the invention, including the best mode, and also to enable any person skilled in the art to practice certain embodiments of the invention, including making and using any devices or systems and performing any incorporated methods. The patentable scope of certain embodiments of the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The following examples pertain to further embodiments. A method comprising mapping an application on a device to a data link layer secondary device type field, attaching the secondary device type field to a data link layer discovery action frame, transmitting the discovery action frame over a peer-to-peer wireless network, and receiving a response comprising a request to access the application provided in the secondary device type field. The method further comprises mapping a device type to a primary device type field.

In one embodiment, the data link layer is based in part on an Open Systems Connection Model Data Link Layer protocol. Also, the discovery action frame comprises a beacon frame, a probe request, or a probe response frame. Further, the mapping of the application may be initiated based in part on detecting the selection of an icon for the application, the icon being displayed on a graphical user interface of the device.

Another exemplary embodiment includes a method comprising receiving an action frame over a peer-to-peer wireless network at a device, the action frame comprising a secondary device type field that includes an application name or identifier, extracting the application name or identifier from the secondary device type field, determining whether the application name or identifier corresponds to an application stored on the device, determining whether to use the peer-to-peer wireless network to exchange information related to the application, and transmitting a response comprising an indication to initiate a peer-to-peer wireless network connection for the application. In one instance, the action frame comprises a primary device type field that comprises device type information and a discovery action frame for an Open Systems Connection Model Data Link layer protocol.

In another embodiment, the method further comprises determining whether the application name or identifier corresponds to an application stored on the device comprises determining whether the corresponding application is compatible with the named application. In one instance, the device is a first device and the application is a first application, and the method is further comprising establishing a peer-to-peer wireless connection between the first application on the first device and a second application on a second device.

Another exemplary embodiment includes one or more tangible computer-readable storage media comprising computer-executable instructions operable to, when executed by at least one computer processor, enable the at least one computer processor to implement a method comprising: mapping an application on a device to a data link layer secondary device type field, attaching the secondary device type field to a data link layer discovery action frame, transmitting the discovery action frame over a peer-to-peer wireless network, and receiving a response comprising a request to access the application provided in the secondary device type field, and mapping a device type to a primary device type field.

In one embodiment, the discovery action frame comprises a beacon frame, a probe request frame, or a probe response frame.

In another embodiment, the method further comprises determining that an icon for the application was selected to initiate a wireless connection for the application, the icon being displayed on a graphical user interface for the device and determining that an available device was selected as a target of the wireless connection for the application.

Another embodiment may include a device comprising memory to store a plurality of applications that are executable on the device, a computer processor to map at least one of the applications to a discovery action frame, a communications module to solicit peer-to-peer wireless connections for the at least one application using the discovery action frame, the communications module to establish a peer-to-peer wireless connection for the at least one application when a response to the discovery action frame is received. The discovery action frame comprises a primary device type field and a secondary device type field. The at least one application is mapped to the secondary device type field and a device type is mapped to the primary device type field. Further, the at least one application comprises one of the following: a file transfer application, a synchronization application, a gaming application, a chat application, or a printing application. Lastly, the discovery action frame comprises a beacon frame, a probe request frame, or a probe response frame.

The claimed invention is:

1. A method comprising:
   determining, by a first device, a first peer-to-peer service sought by the first device;
   determining, by the first device, a probe request frame comprising a first identifier associated with the first peer-to-peer service;
   transmitting, by the first device, before establishing a peer-to-peer connection with a second device, the probe request frame to a second device;
   receiving, by the first device, a probe response frame comprising a second identifier, wherein the probe response frame is received from the second device, wherein the probe response frame comprises an indication of a request associated with establishing the peer-to-peer connection, wherein the indication of the request comprises network information for the first device to communicate with the second device;
   determining, by the first device, that the second identifier matches the first identifier;
   and
   establishing, by the first device, the peer-to-peer connection with the second device based at least in part on the request.

2. The method of claim 1, wherein the probe request frame is a peer-to-peer probe request frame.

3. The method of claim 1, wherein the first peer-to-peer service is a print service or a file transfer service.

4. The method of claim 1, wherein the probe response frame further comprises a third identifier, wherein the third identifier is associated with an address of the second device.

5. The method of claim 1, wherein the probe request frame further comprises a third identifier of a second peer-to-peer service for the first device.

6. A method comprising:
   receiving a probe request frame at a first device, the probe request frame comprising a first identifier of a first peer-to-peer service sought by a second device;
   determining that a second identifier corresponds to the first peer-to-peer service;
   transmitting a probe response frame to the second device, before establishing a peer-to-peer connection with the second device, wherein the probe response frame comprises the second identifier matching the first identifier, wherein the probe response frame further comprises an indication of a request associated with establishing the peer-to-peer connection, wherein the indication of the request comprises network information for the second device to communicate with the first device;
   and
   establishing the peer-to-peer connection with the first peer-to-peer service based at least in part on the request.

7. The method of claim 6, wherein the probe request frame is a peer-to-peer probe request frame.

8. The method of claim 6, wherein the first peer-to-peer service is a print service or a file transfer service.

9. The method of claim 6, wherein the probe response frame further comprises a third identifier, wherein the third identifier is associated with an address of the second device.

10. The method of claim 6, wherein the probe request frame further comprises a third identifier of a second peer-to-peer service for the second device, the method further comprising determining that the third identifier corresponds to the second peer-to-peer service, wherein the probe response frame further comprises a fourth identifier matching the third identifier.

11. One or more non-transitory computer-readable storage media comprising computer-executable instructions operable to, when executed by at least one computer processor, enable the at least one computer processor to implement a method comprising:
   determining, by a first device, a first peer-to-peer service sought by the first device;
   determining a probe request frame comprising a first identifier associated with the first peer-to-peer service;
   transmitting, by the first device, before establishing a peer-to-peer connection with a second device, the probe request frame;
   receiving, by the first device, a probe response frame comprising a second identifier, wherein the probe response frame is received from the second device, wherein the probe response frame comprises an indication of a request associated with establishing the peer-to-peer connection, wherein the indication of the request comprises network information for the first device to communicate with the second device;
   determining that the second identifier matches the first identifier;
   and
   establishing the peer-to-peer connection with the second device based at least in part on the request.

12. The one or more non-transitory computer-readable storage media of claim 11, wherein the probe request frame is a peer-to-peer probe request frame.

13. The one or more non-transitory computer-readable storage media of claim 11, wherein the first peer-to-peer service is a print service or a file transfer service.

14. The one or more non-transitory computer-readable storage media of claim 11, wherein the probe response frame further comprises a third identifier, wherein the third identifier is associated with an address of the second device.

15. The one or more non-transitory computer-readable storage media of claim 11, wherein the probe request frame further comprises a third indicator of a second peer-to-peer service for the first device.

16. A device comprising:
   one or more processors; and
   storage storing one or more applications that are executable by the one or more processors and program instructions that are executable by the one or more processors to:
      determine a first peer-to-peer service sought by the device;

determine a probe request frame comprising a first identifier associated with the first peer-to-peer service;

transmit the probe request frame before establishing a peer-to-peer connection with a second device;

receive, a probe response frame comprising a second identifier, wherein the probe response frame is received from the second device, wherein the probe response frame comprises an indication of a request associated with establishing the peer-to-peer connection, wherein the indication of the request comprises network information for the device to communicate with the second device;

determine that the second identifier matches the first identifier;

and establish the peer-to-peer connection with the second device based at least in part on the request.

17. The device of claim 16, further comprising a transceiver configured to transmit and receive wireless signals.

18. The device of claim 17, further comprising one or more antennas coupled to the transceiver.

19. The device of claim 16, wherein the probe request frame is a peer-to-peer probe request frame.

20. The device of claim 16, wherein the first peer-to-peer service is a print service or a file transfer service.

* * * * *